(12) United States Patent
Rasband

(10) Patent No.: US 10,854,059 B2
(45) Date of Patent: *Dec. 1, 2020

(54) WIRELESS SENSOR NETWORK

(71) Applicant: TYCO FIRE & SECURITY GMBH, Neuhausen am Rheinfall (CH)

(72) Inventor: Paul B. Rasband, Fremont, CA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/373,430

(22) Filed: Apr. 2, 2019

(65) Prior Publication Data
US 2019/0228626 A1 Jul. 25, 2019

Related U.S. Application Data

(63) Continuation of application No. 15/402,423, filed on Jan. 10, 2017, now Pat. No. 10,297,128, which is a
(Continued)

(51) Int. Cl.
*G08B 1/08* (2006.01)
*G08B 13/24* (2006.01)
(Continued)

(52) U.S. Cl.
CPC ............ *G08B 13/2451* (2013.01); *G01S 5/02* (2013.01); *G01S 5/0236* (2013.01); *G01S 5/0284* (2013.01);
(Continued)

(58) Field of Classification Search
CPC .... G08B 13/2451; G08B 7/062; G08B 13/00; G08B 13/19613; G08B 13/22;
(Continued)

(56) References Cited

U.S. PATENT DOCUMENTS 5,414,812 A 5/1995 Filip et al.
5,727,055 A 3/1998 Ivie et al.
(Continued)

FOREIGN PATENT DOCUMENTS

CN 1217078 A 5/1999
CN 1672060 A 9/2005
(Continued)

OTHER PUBLICATIONS

U.S. Appl. No. 61/946,054, filed Jan. 28, 2014, Paul B. Rasband et al.
(Continued)

*Primary Examiner* — Phung Nguyen
(74) *Attorney, Agent, or Firm* — Foley & Lardner LLP (57) ABSTRACT

A building sensor node of a sensor network system, wherein the sensor node includes one or more memory devices configured to store instructions thereon, that, when executed by one or more processors, cause the one or more processors to execute a first function to provide a first functionality, wherein the first function is associated with a next function identifier of a next function. The instructions further cause the one or more processors to transition between a number of states of a state machine based on the next function identifier, verify execution of the next function by comparing the next function identifier to a table of allowed transitions receive an additional function from a server, and update the sensor node to provide a second functionality to the sensor node without rebooting the sensor node based on the additional function received from the server.

20 Claims, 7 Drawing Sheets

Related U.S. Application Data continuation of application No. 14/463,738, filed on Aug. 20, 2014, now Pat. No. 9,541,631.

(60) Provisional application No. 61/973,962, filed on Apr. 2, 2014, provisional application No. 61/946,054, filed on Feb. 28, 2014.

(51) Int. Cl.

| | | |
|---|---|---|
| *H04W 4/029* | (2018.01) | |
| *H04W 4/80* | (2018.01) | |
| *G01S 5/02* | (2010.01) | |
| *G08B 13/196* | (2006.01) | |
| *G08B 25/00* | (2006.01) | |
| *G07C 9/20* | (2020.01) | |
| *G08B 7/06* | (2006.01) | |
| *H04L 29/08* | (2006.01) | |
| *G06K 9/00* | (2006.01) | |
| *G06N 5/02* | (2006.01) | |
| *G08B 13/00* | (2006.01) | |
| *G08B 13/22* | (2006.01) | |
| *G08B 25/10* | (2006.01) | |
| *H04L 12/741* | (2013.01) | |
| *H04N 7/18* | (2006.01) | |
| *H04W 84/18* | (2009.01) | |
| *H04W 88/16* | (2009.01) | |
| *H04W 4/02* | (2018.01) | |

(52) U.S. Cl.
CPC .............. *G01S 5/0294* (2013.01); *G06K 9/00* (2013.01); *G06N 5/027* (2013.01); *G07C 9/20* (2020.01); *G08B 7/062* (2013.01); *G08B 13/00* (2013.01); *G08B 13/19613* (2013.01); *G08B 13/19697* (2013.01); *G08B 13/22* (2013.01); *G08B 13/2491* (2013.01); *G08B 25/009* (2013.01); *G08B 25/10* (2013.01); *H04L 45/74* (2013.01); *H04L 67/02* (2013.01); *H04L 67/10* (2013.01); *H04N 7/181* (2013.01); *H04W 4/029* (2018.02); *H04W 4/80* (2018.02); *H04W 84/18* (2013.01); *H04W 88/16* (2013.01); *H04W 4/02* (2013.01)

(58) Field of Classification Search
CPC .. G08B 25/10; G07C 9/20; G01S 5/02; G01S 5/0236; G01S 5/0284; G01S 5/0294; G06K 9/00; G06N 5/027; H04L 67/02; H04L 67/10; H04N 7/181; H04N 84/18; H04W 4/029; H04W 4/80; H04W 88/16
See application file for complete search history.

(56) References Cited

U.S. PATENT DOCUMENTS

| | | | |
|---|---|---|---|
| 6,012,150 A | 1/2000 | Bartfai et al. | |
| 6,208,247 B1 | 3/2001 | Agre et al. | |
| 6,272,621 B1 | 8/2001 | Key et al. | |
| 6,313,549 B1 | 11/2001 | Moisan et al. | |
| 6,531,963 B1 | 3/2003 | Nyfelt | |
| 6,636,900 B2 | 10/2003 | Abdelnur | |
| 6,873,260 B2 | 3/2005 | Lancos et al. | |
| 6,888,459 B2 | 5/2005 | Stilp | |
| 6,952,574 B2 | 10/2005 | Tealdi et al. | |
| 6,970,183 B1 | 11/2005 | Monroe | |
| 7,005,971 B2 | 2/2006 | Stewart et al. | |
| 7,295,106 B1 | 11/2007 | Jackson et al. | |
| 7,327,251 B2 | 2/2008 | Corbett, Jr. | |
| 7,474,330 B2 | 1/2009 | Wren et al. | |
| 7,535,687 B2 | 5/2009 | Costa | |
| 7,688,808 B2 | 3/2010 | Ren et al. | |
| 7,756,828 B2 | 7/2010 | Baron et al. | |
| 7,855,635 B2 | 12/2010 | Cohn et al. | |
| 7,907,753 B2 | 3/2011 | Wilson et al. | |
| 7,920,843 B2 | 4/2011 | Martin et al. | |
| 7,966,660 B2 * | 6/2011 | Yermal | H04L 63/1416 726/22 |
| 8,089,910 B2 | 1/2012 | Doh et al. | |
| 8,149,849 B2 | 4/2012 | Osborn et al. | |
| 8,164,443 B2 | 4/2012 | Alston et al. | |
| 8,260,893 B1 | 9/2012 | Bandhole et al. | |
| 8,305,196 B2 | 11/2012 | Kennedy et al. | |
| 8,331,544 B2 | 12/2012 | Kraus et al. | |
| 8,350,700 B2 | 1/2013 | Fast et al. | |
| 8,395,494 B2 | 3/2013 | Trundle et al. | |
| 8,400,268 B1 | 3/2013 | Malik et al. | |
| 8,467,763 B2 | 6/2013 | Martin et al. | |
| 8,477,687 B2 | 7/2013 | Iwasa | |
| 8,487,762 B1 | 7/2013 | McMullen et al. | |
| 8,525,665 B1 | 9/2013 | Trundle et al. | |
| 8,572,290 B1 | 10/2013 | Mukhopadhyay et al. | |
| 8,572,600 B2 | 10/2013 | Chung et al. | |
| 8,572,677 B2 | 10/2013 | Bartholomay et al. | |
| 8,582,431 B2 | 11/2013 | Johansen | |
| 8,587,670 B2 | 11/2013 | Wood et al. | |
| 8,611,323 B2 | 12/2013 | Berger et al. | |
| 8,630,820 B2 | 1/2014 | Amis | |
| 8,634,788 B2 | 1/2014 | Wright et al. | |
| 8,643,719 B2 | 2/2014 | Vian et al. | |
| 8,644,165 B2 | 2/2014 | Saarimaki et al. | |
| 8,659,417 B1 | 2/2014 | Trundle et al. | |
| 8,667,571 B2 | 3/2014 | Raleigh | |
| 8,675,920 B2 | 3/2014 | Hanson et al. | |
| 8,676,930 B2 | 3/2014 | Foisy | |
| 8,696,430 B2 | 4/2014 | Wells | |
| 8,700,747 B2 | 4/2014 | Spitaels et al. | |
| 8,700,749 B2 | 4/2014 | Elliott et al. | |
| 8,707,431 B2 | 4/2014 | Stephens et al. | |
| 8,731,689 B2 | 5/2014 | Platner et al. | |
| 8,732,255 B2 | 5/2014 | Odio et al. | |
| 8,732,292 B2 | 5/2014 | Tokunaga et al. | |
| 8,737,957 B2 | 5/2014 | Raleigh | |
| 8,848,721 B2 | 9/2014 | Turunen et al. | |
| 8,989,053 B1 * | 3/2015 | Skaaksrud | G06Q 10/0832 370/255 |
| 9,277,352 B1 | 3/2016 | Ward | |
| 10,282,852 B1 | 5/2019 | Buibas et al. | |
| 2002/0067259 A1 | 6/2002 | Fufidio et al. | |
| 2002/0121979 A1 | 9/2002 | Smith | |
| 2003/0097464 A1 | 5/2003 | Martinez et al. | |
| 2003/0097586 A1 | 5/2003 | Mok | |
| 2003/0216144 A1 | 11/2003 | Roese et al. | |
| 2004/0017929 A1 | 1/2004 | Bramblet et al. | |
| 2004/0027243 A1 | 2/2004 | Carrender | |
| 2004/0090329 A1 | 5/2004 | Hitt | |
| 2004/0103164 A1 | 5/2004 | Tabuchi et al. | |
| 2004/0103165 A1 | 5/2004 | Nixon et al. | |
| 2004/0109059 A1 | 6/2004 | Kawakita | |
| 2004/0135694 A1 | 7/2004 | Nyfelt | |
| 2004/0153671 A1 | 8/2004 | Schuyler et al. | |
| 2005/0052281 A1 | 3/2005 | Bann | |
| 2006/0022816 A1 | 2/2006 | Yukawa | |
| 2006/0035205 A1 | 2/2006 | Dobson et al. | |
| 2006/0039356 A1 | 2/2006 | Rao et al. | |
| 2006/0047666 A1 | 3/2006 | Bedi et al. | |
| 2006/0059557 A1 | 3/2006 | Markham et al. | |
| 2006/0143439 A1 | 6/2006 | Arumugam et al. | |
| 2006/0240818 A1 | 10/2006 | McCoy et al. | |
| 2006/0282886 A1 | 12/2006 | Gaug | |
| 2007/0028119 A1 | 2/2007 | Mirho | |
| 2007/0073861 A1 | 3/2007 | Amanuddin et al. | |
| 2007/0093975 A1 * | 4/2007 | Hoogenboom | H04L 67/025 702/35 |
| 2007/0106775 A1 | 5/2007 | Wong | |
| 2007/0112574 A1 | 5/2007 | Greene | |
| 2007/0185788 A1 | 8/2007 | Dillon | |
| 2007/0186106 A1 | 8/2007 | Ting et al. | |
| 2007/0223451 A1 | 9/2007 | Ren et al. | |
| 2007/0239350 A1 | 10/2007 | Zumsteg et al. | |
| 2007/0248065 A1 | 10/2007 | Banerjea et al. | |
| 2007/0260470 A1 | 11/2007 | Bornhoevd et al. | |

(56) References Cited

U.S. PATENT DOCUMENTS

| | | |
|---|---|---|
| 2008/0002599 A1 | 1/2008 | Yau et al. |
| 2008/0010631 A1 | 1/2008 | Harvey et al. |
| 2008/0056261 A1 | 3/2008 | Osborn et al. |
| 2008/0068150 A1 | 3/2008 | Nguyen et al. |
| 2008/0068267 A1 | 3/2008 | Huseth et al. |
| 2008/0130949 A1 | 6/2008 | Ivanov et al. |
| 2008/0136620 A1* | 6/2008 | Lee .................. G01D 21/00 340/531 |
| 2008/0144587 A1 | 6/2008 | Gupta et al. |
| 2008/0259919 A1 | 10/2008 | Monga |
| 2008/0291017 A1 | 11/2008 | Yermal et al. |
| 2009/0021634 A1 | 1/2009 | Chang |
| 2009/0135007 A1 | 5/2009 | Donovan et al. |
| 2009/0146833 A1 | 6/2009 | Lee et al. |
| 2009/0222921 A1 | 9/2009 | Mukhopadhyay et al. |
| 2009/0243844 A1 | 10/2009 | Ishidera |
| 2009/0322510 A1 | 12/2009 | Berger et al. |
| 2010/0090829 A1 | 4/2010 | Pujol |
| 2010/0124209 A1* | 5/2010 | In .................. H04B 7/2656 370/337 |
| 2010/0217651 A1 | 8/2010 | Crabtree et al. |
| 2010/0226342 A1 | 9/2010 | Colling et al. |
| 2011/0051656 A1* | 3/2011 | Hethuin .............. H04B 7/1555 370/315 |
| 2011/0069687 A1 | 3/2011 | Rezvani et al. |
| 2011/0102171 A1 | 5/2011 | Raji et al. |
| 2011/0109434 A1 | 5/2011 | Hadsall, Sr. |
| 2011/0137614 A1 | 6/2011 | Wheeler et al. |
| 2011/0310779 A1 | 12/2011 | De Poorter et al. |
| 2011/0310791 A1 | 12/2011 | Prakash et al. |
| 2012/0014567 A1 | 1/2012 | Allegra et al. |
| 2012/0039235 A1 | 2/2012 | Chen et al. |
| 2012/0131115 A1 | 5/2012 | Levell et al. |
| 2012/0158161 A1 | 6/2012 | Cohn et al. |
| 2012/0159579 A1 | 6/2012 | Pineau et al. |
| 2012/0197986 A1 | 8/2012 | Chen et al. |
| 2012/0266168 A1 | 10/2012 | Spivak et al. |
| 2012/0310423 A1 | 12/2012 | Taft |
| 2012/0311614 A1 | 12/2012 | Deanna et al. |
| 2013/0003645 A1 | 1/2013 | Shapira et al. |
| 2013/0064233 A1 | 3/2013 | Hethuin et al. |
| 2013/0070745 A1 | 3/2013 | Nixon et al. |
| 2013/0239192 A1 | 9/2013 | Linga et al. |
| 2013/0241744 A1* | 9/2013 | Erdos .................. H04Q 9/00 340/870.02 |
| 2013/0317659 A1 | 11/2013 | Thomas et al. |
| 2013/0318529 A1* | 11/2013 | Bishop ............... G06F 11/30 718/100 |
| 2013/0336230 A1 | 12/2013 | Zou et al. |
| 2013/0346229 A1 | 12/2013 | Martin et al. |
| 2014/0035726 A1 | 2/2014 | Schoner et al. |
| 2014/0052832 A1 | 2/2014 | Dina et al. |
| 2014/0129135 A1 | 5/2014 | Holden et al. |
| 2014/0222892 A1 | 8/2014 | Lee et al. |
| 2015/0074178 A1 | 3/2015 | Hong et al. |
| 2015/0248299 A1 | 9/2015 | Rasband et al. |
| 2015/0249588 A1 | 9/2015 | Leon et al. |
| 2015/0257301 A1 | 9/2015 | Morgan et al. |
| 2017/0270722 A1 | 9/2017 | Tse et al. |
| 2018/0107880 A1 | 4/2018 | Danielsson et al. |
| 2018/0181794 A1 | 6/2018 | Benini et al. |
| 2019/0043281 A1 | 2/2019 | Aman |

FOREIGN PATENT DOCUMENTS

| | | |
|---|---|---|
| CN | 1871782 A | 11/2006 |
| CN | 1981313 A | 6/2007 |
| CN | 101067843 A | 11/2007 |
| CN | 101199187 A | 6/2008 |
| CN | 101364734 A | 2/2009 |
| CN | 101764759 A | 6/2010 |
| CN | 101951341 A | 1/2011 |
| CN | 101976377 A | 2/2011 |
| CN | 101977124 A | 2/2011 |
| CN | 102035738 A | 4/2011 |
| CN | 102316053 A | 1/2012 |
| CN | 102325075 A | 1/2012 |
| CN | 202475489 U | 10/2012 |
| EP | 0 814 393 A1 | 12/1997 |
| EP | 1 885 039 A2 | 2/2008 |
| JP | 2008-090861 A | 4/2008 |
| WO | WO-01/06401 A1 | 1/2001 |
| WO | WO-01/26329 A2 | 4/2001 |
| WO | WO-2004/068855 A1 | 8/2004 |
| WO | WO-2008/139203 | 11/2008 |
| WO | WO-2009/017687 A1 | 2/2009 |
| WO | WO-2009/079036 A1 | 6/2009 |
| WO | WO-2013/091678 A1 | 6/2013 |
| WO | WO-2013/159217 A1 | 10/2013 |

OTHER PUBLICATIONS

U.S. Appl. No. 61/973,962, filed Apr. 2, 2014, Stewart E. Hall et al.
Chen et al., Enix: a lightweight dynamic operating system for tightly constrained wireless sensor platforms, Proceedings of the 8th ACM Conference on Embedded Networked Sensor Systems, dated Nov. 3, 2010, 14 pages. http://sensys.acm.org/2010/Papers/p183-Chen.pdf.
Cheng, Research on AODV Routing Protocol of Wireless Network, Chinese Master's Theses Full-Text Database, Information Technology Division, dated Jul. 15, 2007, pp. 20-58.
Depoorter, Eli, et al., Enabling Direct Connectivity Between Heterogeneous Objections in the Internet of Things Through a Network Service Oriented Architecture, http://jwcn.eurasigjournals.com/content/pdf/1687-1499-2011-61.pdf, dated Aug. 31, 2011, 14 pages.
European Search Report on EP 15755714, dated Oct. 25, 2017, 11 pages.
European Search Report on EP 15756099, dated Oct. 26, 2017, 19 pages.
International Search Report and Written Opinion on Application No. PCT/US15/17491, dated Jun. 10, 2015, 16 pages.
International Search Report and Written Opinion on Application No. PCT/US15/17680, dated Jun. 24, 2015, 12 pages.
International Search Report and Written Opinion on Application No. PCT/US15/17688, dated Jun. 8, 2015, 10 pages.
International Search Report and Written Opinion on Application No. PCT/US15/17696 dated Jun. 8, 2015, 12 pages.
International Search Report and Written Opinion on Application No. PCT/US15/17702 dated Jun. 17, 2015, 16 pages.
International Search Report and Written Opinion on Application No. PCT/US15/17931 dated Jun. 10, 2015, 11 pages.
International Search Report and Written Opinion on PCT/US15/017450, dated Jun. 10, 2015, 6 pages.
International Search Report and Written Opinion on PCT/US/017477, dated Jun. 10, 2015, 7 pages.
International Search Report and Written Opinion on PCT/US15/017481, dated Jun. 10, 2015, 6 pages.
International Search Report and Written Opinion on PCT/US15/017491, dated Jun. 10, 2015, 6 pages.
International Search Report and Written Opinion on PCT/US15/024050, dated Jul. 20, 2015, 8 pages.
International Search Report and Written Opinion on PCT/US2015/017212, dated Jun. 2, 2015, 10 pages.
International Search Report and Written Opinion on PCT/US2015/017491, dated Jun. 10, 2015, 15 pages.
International Search Report and Written Opinion on PCT/US2015/017924, dated Jun. 5, 2015, 12 pages.
International Search Report and Written Opinion on PCT/US2015/017931, dated Jun. 10, 2015, 11 pages.
Office Action on CN 201580013943.0, dated Mar. 21, 2019, 20 pages with translation.
Office Action on CN 201580013946.4, dated May 8, 2019, 9 pages with translation.
Office Action on CN 201580013946.4, dated Jul. 31, 2018, 13 pages with translation.
Office Action on CN 201580015274.0, dated Feb. 3, 2019, 13 pages with translation.

(56) References Cited

OTHER PUBLICATIONS

Office Action on CN 201580015274.0, dated Jul. 3, 2019, 11 pages with translation.
Office Action on CN 201580015282.5, dated Sep. 4, 2018, 18 pages with translation.
Office Action on CN 201580016948.9, dated May 25, 2018. 24 pages with translation.
Office Action on CN 201580019382.5, dated Jul. 31, 2019, 17 pages with translation.
Office Action on CN 201580019386.3, dated Jun. 4, 2019, 34 pages with translation.
Office Action on CN 201580019691.2, dated Apr. 29, 2019, 15 pages with translation.
Office Action on CN 201580019697.X, dated Feb. 26, 2019, 20 pages with translation.
Office Action on CN 201580020164.3 dated Mar. 27, 2019, 24 pages with translation.
Office Action on CN 201580021841.3, dated Jun. 26, 2019, 16 pages with translation.
Office Action on CN 201580026024.7, dated Jun. 4, 2019, 12 pages with translation.
Office Action on EP 15754691.2, dated May 10, 2019, 5 pages.
Office Action on EP 15754909.8, dated May 20, 2019, 6 pages.
Office Action on EP 15754909.8, dated Sep. 11, 2018, 5 pages.
Office Action on EP 15755018.7, dated Jul. 9, 2019, 6 pages.
Office Action on EP 15755018.7, dated Sep. 11, 2018, 5 pages.
Office Action on EP 15755117.7, dated Aug. 9, 2019, 6 pages.
Office Action on EP 15755117.7, dated Oct. 4, 2018, 6 pages.
Office Action on EP 15755330.6, dated Jun. 19, 2019, 6 pages.
Office Action on EP 15755330.6, dated Oct. 1, 2018, 5 pages.
Office Action on EP 15755456.9, dated Mar. 7, 2019, 5 pages.
Office Action on EP 15755880.0, dated Jan. 30, 2019, 5 pages.
Office Action on JP 2016-560736, dated Feb. 5, 2019, 5 pages with translation.
Supplementary European Search Report on 15754909.8, dated Nov. 7, 2017, 10 pages.
Supplementary European Search Report on EP 15774423, dated Nov. 17, 2017, 1 page.
Asada et al, Wireless Integrated Network Sensors (WINS) Proceedings of the Spie, Spie, Bellingham, VA, vol. 3673, Mar. 1, 1999, pp. 11-18.
European Search Report, PCT/US2015/017212, dated Jan. 2, 2018.
European Search Report, PCT/US2015/017221, dated Feb. 23, 2018.
European Search Report, PCT/US2015/017696, dated Feb. 23, 2018.
Examination Report (China), dated May 2, 2018.
Gopinath Rao, Zeldy Suryadi, Usman Sarwar and Mazlan Abbas, A Gateway Solution for IPV6 Wireless Sensor Networks, International Conference on Ultra-Modern Communications (ICUMT), Oct. 12-14, 2009, IEEE, pp. 1-6.
Hill et al, The Platforms Enabling Wireless Sensor Networks, Communications of the ACM, Jun. 2004, vol. 47, No. 6, 6 pages.
International Extended Search Report on Application No. PCT/US00/27515, dated Oct. 18, 2001, 14 pages.
International Search Report & Written Opinion on Application No. PCT/US2015/017212, dated Jun. 2, 2015, 10 pages.
International Search Report and Written Opinion on Application No. PCT/US15/17924, dated Jun. 5, 2015, 7 pages.
International Search Report and Written Report on Application No. PCT/US2015/017221, dated May 26, 2015, 11 pages.
International Supplementary Search Report on Application No. PCT/US2015/017931, dated Mar. 11, 2017, 11 pages.
Supp. EP Search Report, PCT/US2015/017491, dated Jan. 22, 2018.
Zhou, Ying et al., "Mobile Agent-based Policy Management for Wireless Sensor Networks,", Wireless Communications, Networking and Mobile Computing, 2005, Proceedings 2005 Int'l Conference on Wuhan, China, vol. 2, Sep. 23, 2005, pp. 1207-1210.
Eugster et al., "The many faces of publish/subscribe," ACM computing surveys (CSUR) 35.2, 2003, pp. 114-131.
Hunkeler et al., "MQTT-S—A publish/subscribe protocol for Wireless Sensor Networks," 2008 3rd International Conference on Communication Systems Software and Middleware and Workshops (COMSWARE'08), IEEE, 8 pages.
Zoumboulakis et al., "Active rules for sensor databases," Proceedings of the 1st international workshop on Data management for sensor networks, in conjunction with VLDB 2004, ACM, 2004, 6 pages.
Search Report on EP 15774423.6 dated Jan. 7, 2020, 6 pages.
Liang, "Social Network Service," Mar. 31, 2013, pp. 137-138. English translation unavailable.
Office Action on CN 201580022068.2, dated Aug. 26, 2020, 13 pages with English translation.
Office Action on CN 201580013946.4, dated Sep. 25, 2020, 13 pages with English translation.

\* cited by examiner

WIRELESS SENSOR NETWORK

CROSS-REFERENCE TO RELATED PATENT APPLICATIONS

This application is a continuation of U.S. application Ser. No. 15/402,423, entitled: "Wireless Sensor Network," filed Jan. 10, 2017, now U.S. Patent No. 10,297,128, which is a continuation of U.S. Pat. No. 9,541,631, entitled: "Wireless Sensor Network", filed Aug. 20, 2014, which claims the benefit of provisional U.S. Patent Application 61/973,962, filed on Apr. 2, 2014, entitled: "Wireless Sensor Network," and provisional U.S. Patent Application 61/946,054, filed on Feb. 28, 2014, entitled: "Wireless Sensor Network," the entire contents of which are hereby incorporated by reference.

BACKGROUND

This description relates to operation of sensor networks such as those used for security, intrusion and alarm systems installed on commercial or residential premises.

It is common for businesses and homeowners to have a security system for detecting alarm conditions at their premises and signaling the conditions to a monitoring station or to authorized users of the security system. Security systems often include an intrusion detection panel that is electrically or wirelessly connected to a variety of sensors. Those sensors types typically include motion detectors, cameras, and proximity sensors (used to determine whether a door or window has been opened). Typically, such systems receive a very simple signal (electrically open or closed) from one or more of these sensors to indicate that a particular condition being monitored has changed or become unsecure.

SUMMARY

However, such networks generally use a combination of wired and wireless links between the computing devices, with wireless links usually used for end-node device to hub/gateway connections. Virtually all of the devices involved in the network use some form of simple software, but in the end-nodes and hub/gateway this software is simple in form, involves little advanced capability in data reduction and decision making, and is quite static, meaning that the software typically does not change frequently. However, when the software on these lower level devices is updated, which is not frequently, traditional boot-loading methods are used. However, these boot-loading methods are time-consuming, energy-consuming, and require rebooting of the updated device, which can present a security/alarm issue.

According to an aspect a networked sensor system includes an upper tier of server devices, the server devices including processor devices and memory in communication with the processor devices. The system also includes a middle tier of gateway devices that are in communication with one or more of the upper tier server devices and a lower level tier of devices that include fully functional sensor nodes with at least some of the fully functional sensor nodes including an application layer that executes routines to provide node sensor functions and an application layer manager to manage the application layer in the at least some of the functional nodes in the lower tier of devices.

In one aspect, the inventive concepts disclosed herein are directed to a building sensor node of a sensor network system, wherein the sensor node includes one or more memory devices configured to store instructions thereon, that, when executed by one or more processors, cause the one or more processors to execute a first function to provide a first functionality, wherein the first function is associated with a next function identifier of a next function, transition between a number of states of a state machine based on the next function identifier, verify execution of the next function by comparing the next function identifier to a table of allowed transitions, receive an additional function from a server, and update the sensor node to provide a second functionality to the sensor node without rebooting the sensor node based on the additional function received from the server.

In some embodiments, the building sensor node is a sensor node of an intrusion detection system. In some embodiments, the instructions cause the one or more processors to receive instructions from the server causing the sensor node to individually delete, substitute, or add functions to the sensor node altering states in the state machine. In some embodiments, wherein the next function identifier is not in the table of allowed transitions, the instructions cause the one or more processors to execute a default function. In some embodiments, the instructions cause the one or more processors to update the table of allowed transitions in response to receiving the additional function from the server. In some embodiments, the first function may execute multiple times by specifying the first function as the next function identifier. In some embodiments, the sensor node communicates with the server via a network tier including one or more gateways.

Aspects can also include methods, computer program products and systems.

One or more advantages may be provided from one or more of the above aspects.

The network can use a combination of wired and wireless links, preferable wired between the tiers, especially with wireless links between the middle and lower tier connections (for example, end-node device to hub/gateway). The devices involved in the network can include advanced capabilities areas such as data reduction and decision making, and the capabilities of the device are dynamically changeable, meaning that the software can be updated without the traditional boot-loading methods avoiding the time-consuming, energy-consuming, and rebooting required by the updated device, thus avoiding potential security/alarm issues when such sensor and other end node devices are updated. This enables management of such sensors and other end node devices having advanced capabilities in data reduction and decision making.

The details of one or more embodiments of the invention are set forth in the accompanying drawings and the description below. Other features, objects, and advantages of the invention is apparent from the description and drawings, and from the claims.

DETAILED DESCRIPTION

Described herein are examples of network features that may be used in various contexts including, but not limited to, security/intrusion and alarm systems. Example security systems may include an intrusion detection panel that is electrically or wirelessly connected to a variety of sensors. Those sensors types may include motion detectors, cameras, and proximity sensors (used, e.g., to determine whether a door or window has been opened as well as other types of sensors). Typically, such systems receive a relatively simple signal (electrically open or closed) from one or more of these sensors to indicate that a particular condition being monitored has changed or become unsecure.

For example, typical intrusion systems can be set-up to monitor entry doors in a building. When a door is secured, a proximity sensor senses a magnetic contact and produces an electrically closed circuit. When the door is opened, the proximity sensor opens the circuit, and sends a signal to the panel indicating that an alarm condition has occurred (e.g., an opened entry door).

Data collection systems are becoming more common in some applications, such as home safety monitoring. Data collection systems employ wireless sensor networks and wireless devices, and may include remote server-based monitoring and report generation. As described in more detail below, wireless sensor networks generally use a combination of wired and wireless links between computing devices, with wireless links usually used for the lowest level connections (e.g., end-node device to hub/gateway). In an example network, the edge (wirelessly-connected) tier of the network is comprised of resource-constrained devices with specific functions. These devices may have a small-to-moderate amount of processing power and memory, and may be battery powered, thus requiring that they conserve energy by spending much of their time in sleep mode. A typical model is one where the edge devices generally form a single wireless network in which each end-node communicates directly with its parent node in a hub-and-spoke-style architecture. The parent node may be, e.g., an access point on a gateway or a sub-coordinator which is, in turn, connected to the access point or another sub-coordinator.

Figure 1:
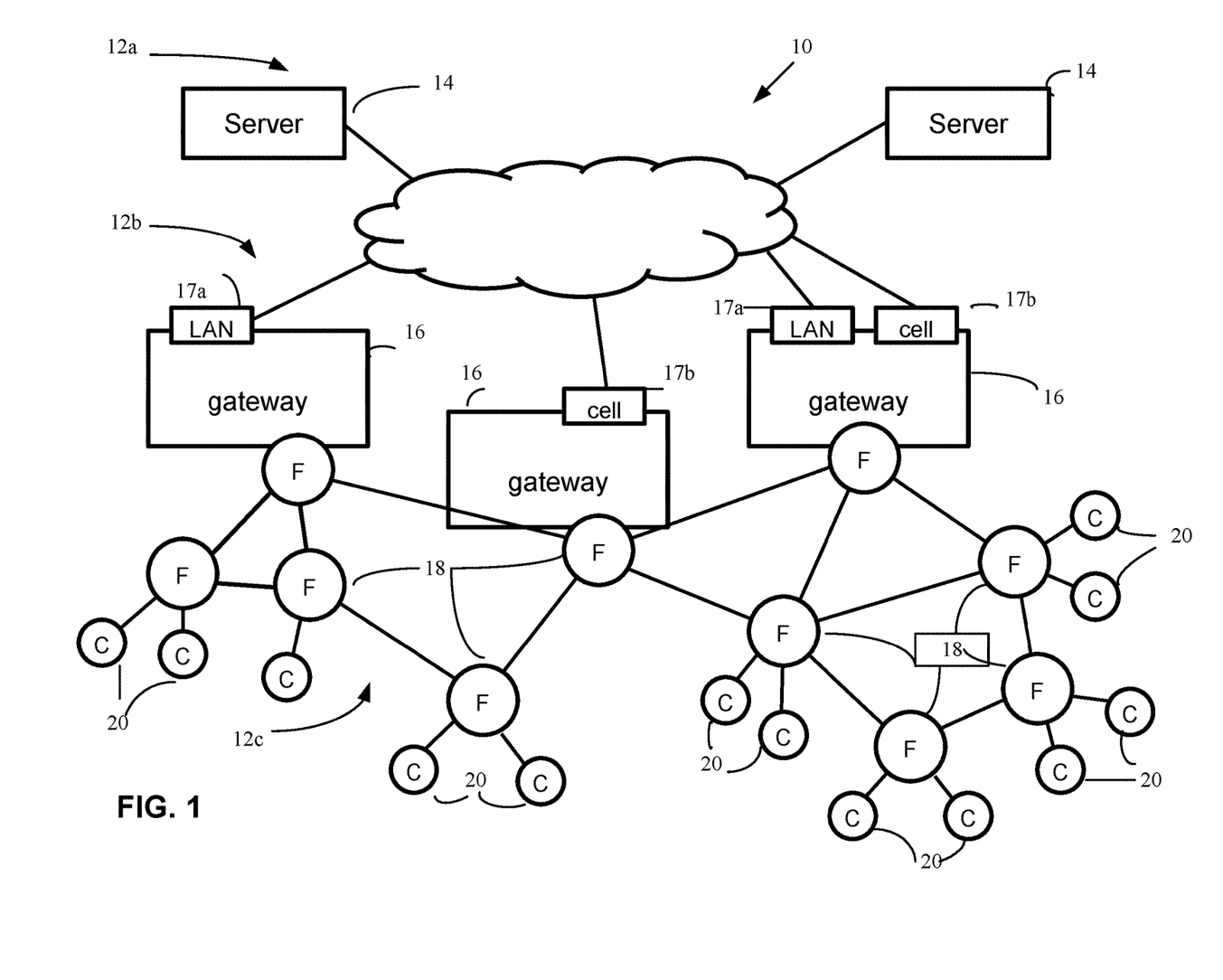
FIG. 1 is a schematic diagram of an exemplary networked security system.

Referring now to FIG. 1, an exemplary (global) distributed network 10 topology for a Wireless Sensor Network (WSN) is shown. In FIG. 1 the distributed network 10 is logically divided into a set of tiers or hierarchical levels 12a-12c.

In an upper tier or hierarchical level 12a of the network are disposed servers and/or virtual servers 14 running a "cloud computing" paradigm that are networked together using well-established networking technology such as Internet protocols or which can be private networks that use none or part of the Internet. Applications that run on those servers 14 communicate using various protocols such as for Web Internet networks XML/SOAP, RESTful web service, and other application layer technologies such as HTTP and ATOM. The distributed network 10 has direct links between devices (nodes) as shown and discussed below.

The distributed network 10 includes a second logically divided tier or hierarchical level 12b, referred to here as a middle tier that involves gateways 16 located at central, convenient places inside individual buildings and structures. These gateways 16 communicate with servers 14 in the upper tier whether the servers are stand-alone dedicated servers and/or cloud based servers running cloud applications using web programming techniques. The middle tier gateways 16 are also shown with both local area network 17a (e.g., Ethernet or 802.11) and cellular network interfaces 17b.

The distributed network topology also includes a lower tier (edge layer) 12c set of devices that involve fully-functional sensor nodes 18 (e.g., sensor nodes that include wireless devices, e.g., transceivers or in some implementations just transmitters or receivers, which in FIG. 1 are marked in with an "F") as well as constrained wireless sensor nodes or sensor end-nodes 20 (marked in the FIG. 1 with "C"). In some embodiments wired sensors (not shown) can be included in aspects of the distributed network 10.

Constrained computing devices 20 as used herein are devices with substantially less persistent and volatile memory compared to other computing devices, sensors in a detection system. Currently examples of constrained devices would be those with less than about a megabyte of flash/persistent memory, and less than 10-20 kbytes of RAM/volatile memory). These constrained devices 20 are configured in this manner; generally due to cost/physical configuration considerations.

In a typical network, the edge (wirelessly-connected) tier of the network is comprised of highly resource-constrained devices with specific functions. These devices have a small-to-moderate amount of processing power and memory, and often are battery powered, thus requiring that they conserve energy by spending much of their time in sleep mode. A typical model is one where the edge devices generally form a single wireless network in which each end-node communicates directly with its parent node in a hub-and-spoke-style architecture. The parent node may be, e.g., an access point on a gateway or a sub-coordinator which is, in turn, connected to the access point or another sub-coordinator.

Each gateway is equipped with an access point (fully functional node or "F" node) that is physically attached to that access point and that provides a wireless connection point to other nodes in the wireless network. The links (illustrated by lines not numbered) shown in FIG. 1 represent direct (single-hop network layer) connections between devices. A formal networking layer (that functions in each of the three tiers shown in FIG. 1) uses a series of these direct links together with routing information used at intermediate routing-capable devices to send messages (fragmented or non-fragmented) from one device to another over the network.

The WSN 10 implements a state machine approach to an application layer that runs on the lower tier devices 18 and 20. Discussed below is an example of a particular implementation of such an approach. States in the state machine are comprised of sets of functions that execute in coordination, and these functions can be individually deleted or substituted or added to in order to alter the states in the state machine of a particular lower tier device.

The WSN state function based application layer uses an edge device operating system (not shown, but such as disclosed in the above mentioned provisional application) that allows for loading and execution of individual functions (after the booting of the device) without rebooting the device (so-called "dynamic programming"). In other implementations, edge devices could use other operating systems provided such systems allow for loading and execution of individual functions (after the booting of the device) preferable without rebooting the edge devices.

Figure 2:
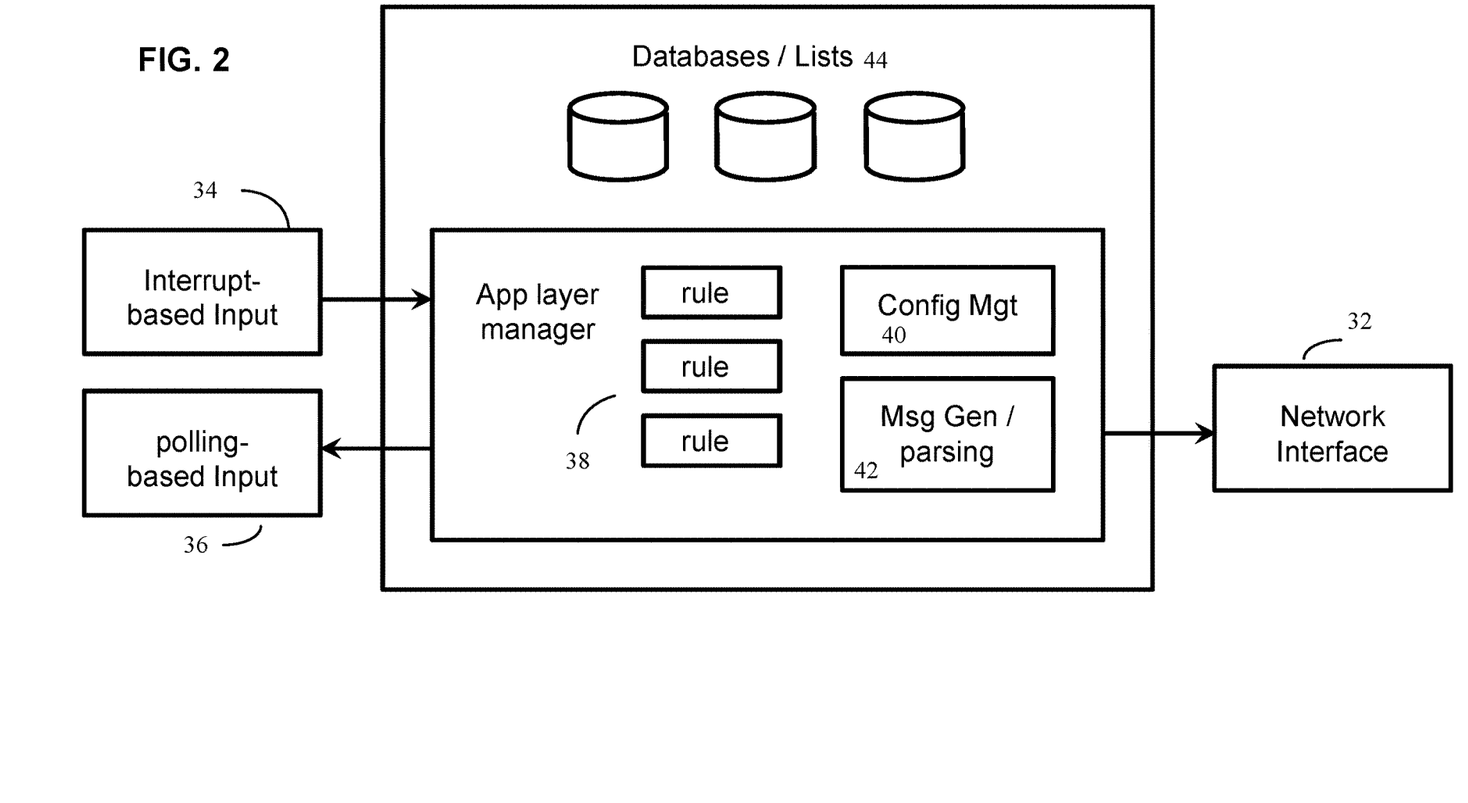
FIG. 2 is a block diagram of generic application layer manager.

Referring now to FIG. 2, an embodiment an application layer manager 30 is shown. The application layer manager 30 is generic in the sense that the application layer manager 30 does not depend upon a specific application solution or "business" logic details in the devices that are updated, e.g., devices 18, 20 (lower tier 12c FIG. 1). The application layer manager 30 handles "pass-offs" (changes in functions currently operating) from function to function, on, e.g., the nodes, e.g., devices 18, 20. These pass-offs are requested by actual state functions executing in the nodes or devices 18, 20.

The application layer manager 30 accomplishes such "pass-offs" (changes in functions currently operating) using a transition table (FIG. 4) that serves as a central descriptor for the state functions. Inputs to the application layer manager 30 include parsed messages from the network layer via interface 32. The application layer manager 30 includes interrupt and polling based inputs via processor peripheral interrupts from interrupt interface 34 and polled sensor/peripheral inputs via interface 36.

The application layer manager 30 involves characterizing inputs sufficiently to apply rules 38 that dictate changes in configuration, stored data, and/or precipitate message generation. The application layer manager 30 has rules 38 and a configuration manager 40 as well as a message generator/parser 42. The application layer manager 30 uses network message and sensor/processor peripheral based inputs, local data stores 44 (for transition table) and lists, configuration management functions, rules set, and report generation capabilities as shown.

Edge Application Layer Architecture

Figure 3:
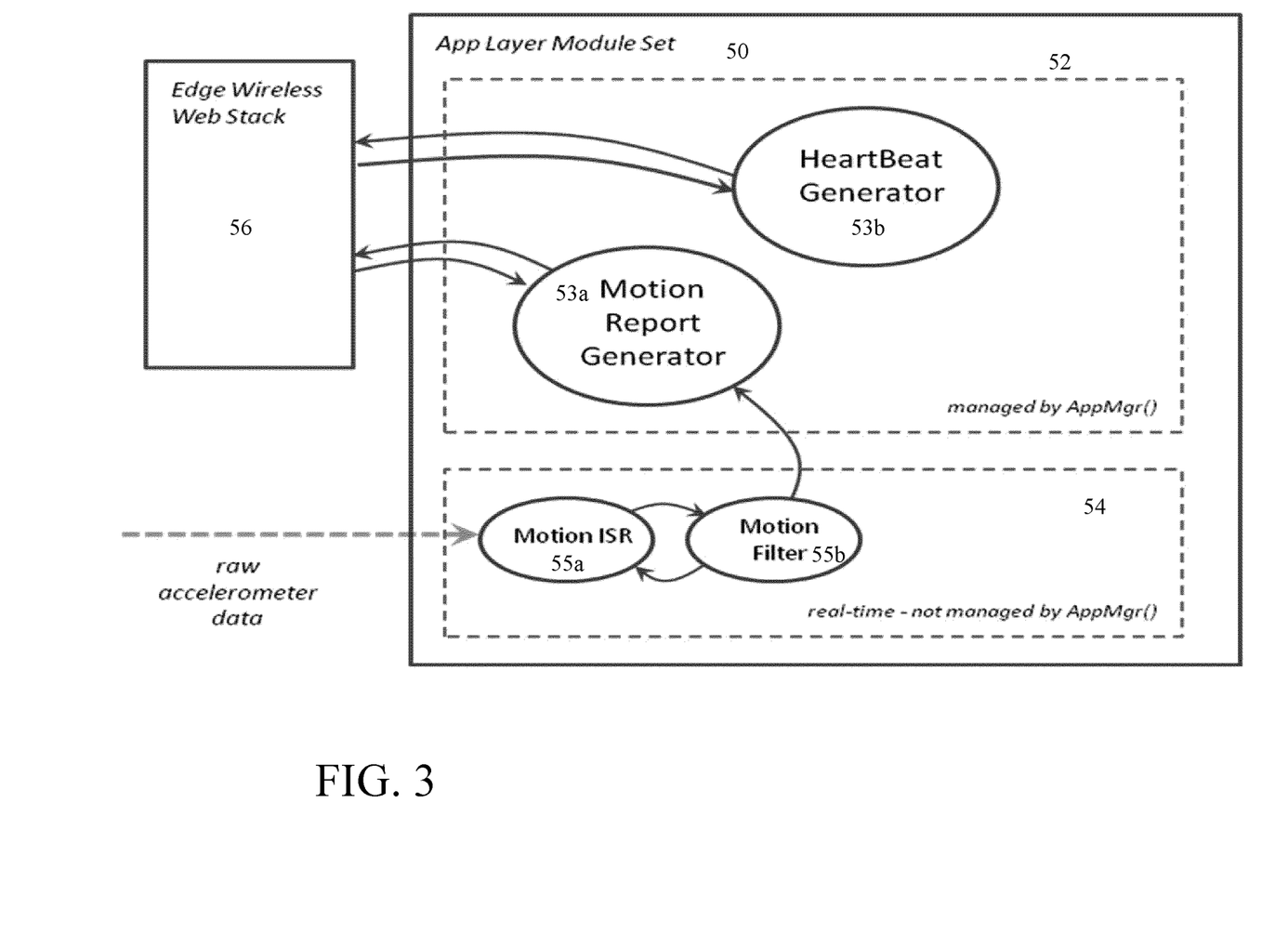
FIG. 3 is a block diagram showing an example process on the application layer manager.

Referring to FIG. 3, an application module set 50 includes an application layer 50 for the edge devices 18 and 20 (FIG. 1) is shown. The application module set 50 includes a layer 52 that is managed by the application layer manager (FIG. 4) and a layer 54 that is not managed by the application layer manager. In this embodiment, the application layer manager is separate from, e.g., isolated from these other firmware modules used at the edge of the WSN (e.g., wireless web modules, EDFF's, etc. not shown) in order to apply changes in the application layer code without requiring changes to code in these other modules. In addition, as shown real-time processing of motion ISR and motion filter are not handled by the application layer manager, whereas motion report generator and heart beat generator are handled by the application layer manager.

The application module set 50 depicted in the example of FIG. 3 includes functions managed by the application layer, e.g., a motion report generator 53a and heartbeat generator 53b that are in communication with a stack 56. Changes to the application layer 52 are possible by having an understanding of the details of the workings of the application layer 52 without the need to fully understand all of the details of these other isolated modules. This is desirable as different groups of individuals and/or systems may be tasked with the coding and maintenance of the respective modules. Also, the application layer 52 is configured in a general way that supports the upgrading of portions of the application layer (e.g., individual business rules, reports, filters, and other functions) without requiring updating of the entire application layer.

FIG. 3 in addition, depicts a state diagram among various processes running in the application module set and with interaction with a transition table as set out below.

| Function Name (assigned externally) | Function ID (assigned externally) | Allowed Transitions (assigned externally) | Function Index (assigned by AppMgr) | Execution Type (assigned externally) |
| --- | --- | --- | --- | --- |

Figure 4:
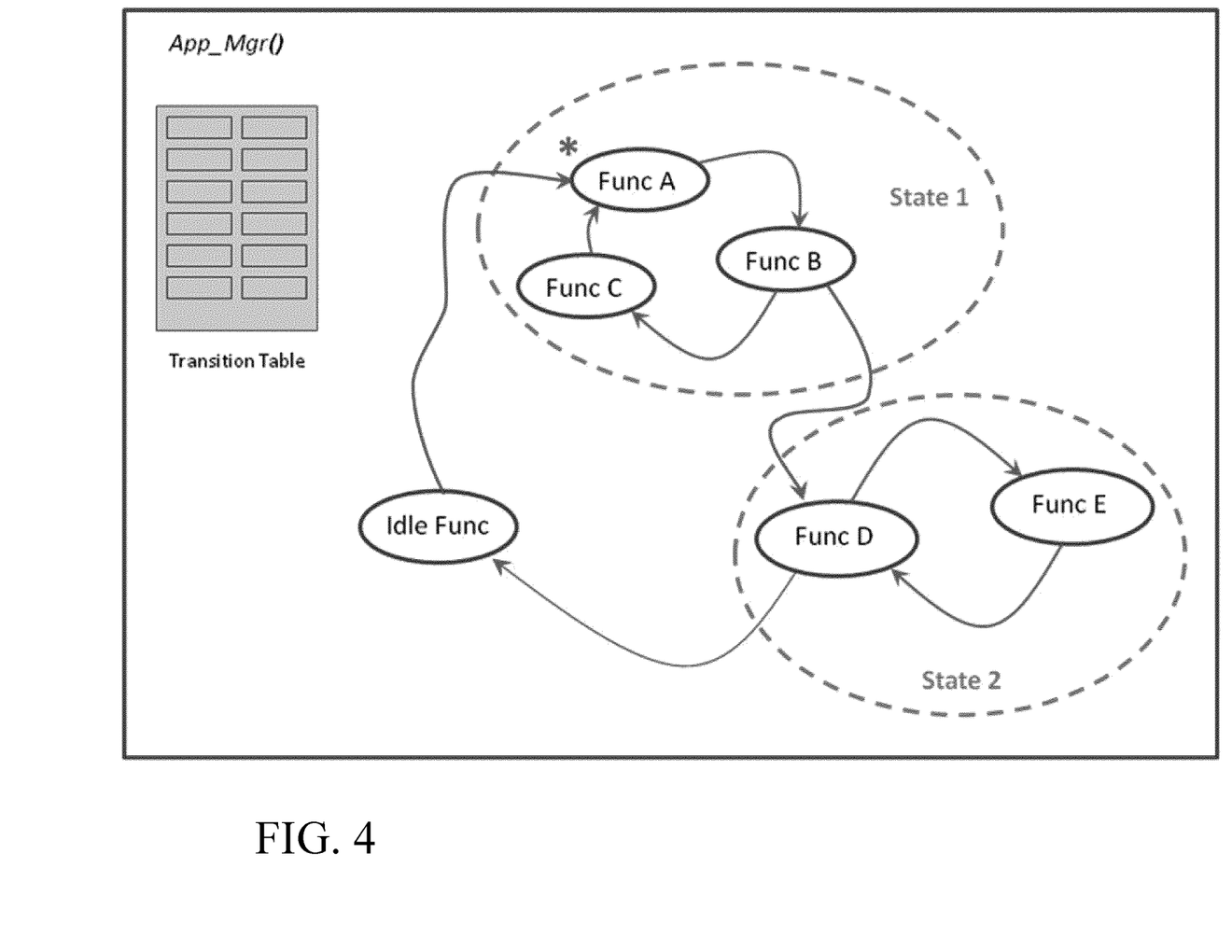
FIG. 4 is a diagram of exemplary state transitions on the application layer manager.

Referring now to FIG. 4, an exemplary situation involving the Application layer manager 50 (App_Mgr( )) where there are two states (State 1 with functions A, B, and C, and State 2 with functions D and E) is shown. The transition table governs state transitions.

The transition table shows what state (or states in the case of a nondeterministic finite automaton) a finite semi-automaton or finite state machine will move to, based on the current state of the machine and other inputs. A state table is essentially a truth table in which some of the inputs are the current state and the outputs include the next state along with other outputs. A state table is one of several ways to specify a state machine, other ways being a state diagram, and a characteristic equation.

State 1 is the normal state and has an entry point, "Func A." Normally, State 1 executes "Func A" which requests "Func B" which requests execution of "Func C." In the example, a condition occurs (actual condition is implementation specific and the detail of which is not necessary to understand what follows). Under this situation with the condition occurring State 1 transitions to State 2 when "Func B" requests execution of "Func D" rather than "Func C." State 2 may exists for only one cycle (D-E-exit) or many cycles (D-E-D-E- . . . -exit). However, when the exit occurs in this example, it does so without calling any function. By default then, the AppMgr's Idle function runs Func A since it is the entry point function.

App Layer Modularity

Figure 5:
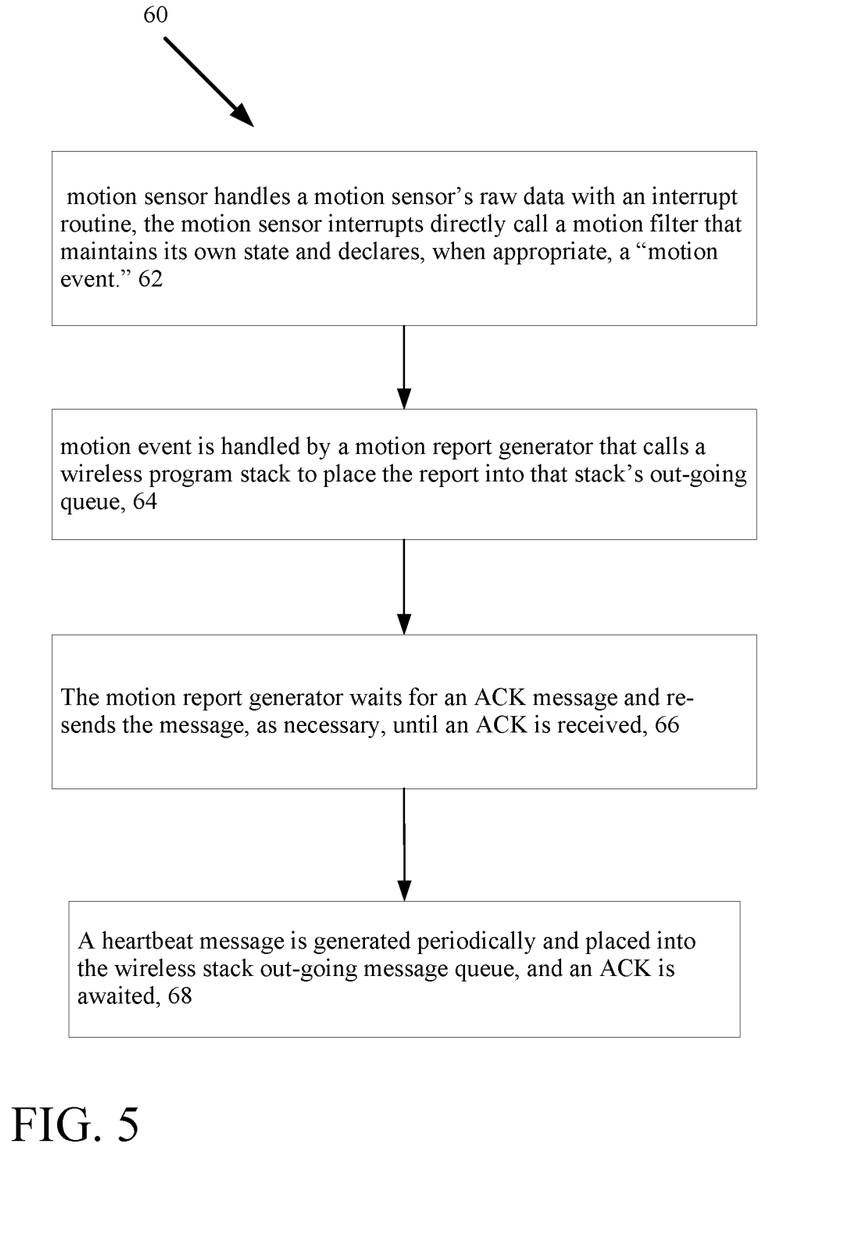
FIGS. 5 and 6 are flow charts.

Referring to FIG. 5, a "typical" application 60 on a motion sensor handles a motion sensor's raw data with an interrupt routine, the motion sensor interrupt service routing directly calls a motion filter that maintains its own state and declares, when appropriate, a "motion event" 62. The motion event is handled 64 (after perhaps a bit of un-deterministic latency) by a motion report generator that calls a wireless program stack to place the report into that stack's out-going queue. The motion report generator waits 66 for an ACK message and re-sends the message, as necessary, until an ACK is received. A heartbeat message is generated 68 periodically and placed into the wireless stack out-going message queue, and an ACK is awaited. (Heartbeat messages are not re-submitted after delivery failure, but a new heartbeat message is not sent until the result of the previous send is obtained from the wireless stack.)

Figure 6:
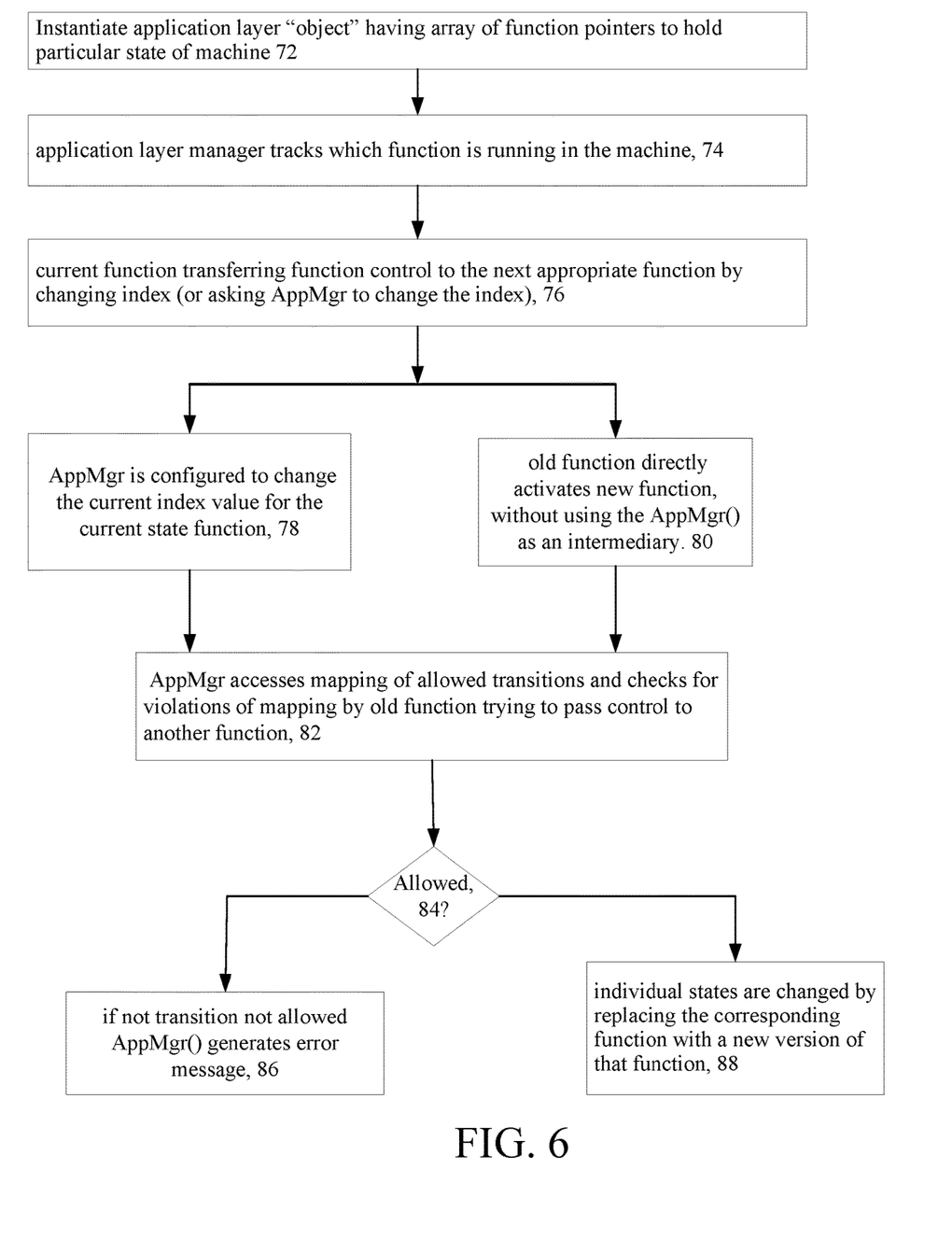

Referring now to FIG. 6, the application layer is configured to satisfy the requirement of modularity by defining and linking together different portions of the application layer so that individual portions are updatable over the wireless link without breaking the overall application. The application layer instantiates 72 an "object" that is a fundamental building block for application layer "machine." The object has an array of function pointers, with each function serving as a "keeper", e.g., holding of a particular state and a special manager function (application layer manager 30 or "App-Mgr") that tracks 74 which function is running in the machine (i.e., which array index is in effect).

State transitions are accomplished by the current function transferring 76 function control to the next appropriate function marking entrance into the new states (e.g., FuncD in FIG. 4) by changing 76 this index (or asking AppMgr to change the index. The AppMgr is general with "hardwired"

business logic residing in the individual state functions, rather than in the AppMgr and individual states are changed by replacing the corresponding function with a new version of that function, transmitted from an external host such as a gateway. Thus, making changes to an allowed state transition (either adding a new transition or deleting an old one) is accomplished by replacing the functions which participate in the state change with the new functions.

In some embodiments, the AppMgr is configured 78 to actually change the current index value for the current state function, whereas in others the old function directly activates 80 the new function, without using the AppMgr( ) as an intermediary. This is because the AppMgr has a mapping 82 of allowed transitions and check 84 for violations of this mapping (i.e., a given function tries to pass control to another function and in so doing make a state transition that is not allowed). This helps to verify that changes to the state machine behavior are valid and that changes to the state machine behavior actually take place, since an error message will be generated by AppMgr( ) 86 when an erroneous state change is requested by a function. Otherwise, individual states are changed by replacing the corresponding function with a new version of that function, 88.

Example Application

Let p_AppFunc[i] be a pointer to the ith application function. Let N_i be the "current index" value maintained by AppMgr( ). N_i is a global variable that retains its value from one pass through AppMgr( ) to the next.

AppMgr is a root function that is executed by a (EDFF) scheduler such as in the operating system running on the edge device. AppMgr runs completely through every few milliseconds. Each time AppMgr( ) runs, AppMgr executes the function pointed to by p_AppFunc[N_i]. In some embodiments, the state machine can be implemented as a set of arrays, whereas in more complex implementations the state machine is implemented as a set of functions that are linked through a linked list to allow for an indeterminate number of states in the state machine.

For some states, only one function call may be required. That is, p_AppFunc[N_i] would run once and then N_i would change to a different value, say N_k so that on the next call of AppMgr( ), a different state would be entered (i.e., p_AppFunc[N_k] would run). For other states the corresponding function might run many times before N_i changes. An example of the single-run function would be the sending of a report. An example of the multi-run function would be the activity of a sensor filter that acts on raw data from a sensor device.

The various functions p_AppFunc[i] not only decide when they should request that AppMgr( ) make a state change, but these functions indicate what new function(s) (e.g., what new value(s) of N_i) AppMgr( ) should choose from, as AppMgr( ) is configured to be fairly generic and thus all business logic, including the description of transitions between states, is contained in the p_AppFunc[ ] functions.

Simultaneous Actions

The two p_AppFunc[ ] functions need to have different tasks done at the same time, for example, simultaneously filtering data from two sensors (e.g., de-bouncing a switch and filtering motion data from an accelerometer. One general approach to providing an AppMgr is to run two state functions at a time (execute both with each pass through AppMgr). Another approach keeps AppMgr simple and just requires that application states provided with code to make calls to each other and thus invoke each other. That is, p_AppFunc[N_i] requests execution of p_AppFunc[N_k] upon termination of execution of p_AppFunc[N_i] and vice versa. In effect, the two app functions split the time and attention of AppMgr without AppMgr planning for time sharing.

The various versions of p_AppFunc[ ] are maintained in an executable code repository in the gateway and cloud, and each such function can have an ID number that is used to differentiate one version of a function from another (and in many cases the differences in the generations or versions of the function may be small but important, so getting exactly the right ID number). Inside a given function, the requested change to a different function or state becomes very specific with respect to a code version, therefore there is logical that the parameter used by a function to request a state change (function change) is actually the ID number of the new function.

A simple way to manage versions is to give App Layer state functions their own file type. File type is maintained as one of the fields in the file index in, e.g., flash memory so that the initialization process of AppMgr( ) during bootup searches for files of that type in the flash memory, and produces the array of function pointers, with index i running from 0 to a maximum value, i_max.

During this initialization AppMgr( ) maps each value i to a function, p_AppFunc[i] and that function's corresponding function ID, and produces a table showing, for each function ID, the corresponding index value i, and the allowed state transitions (function IDs for functions reachable from the current function).

For example, during the course of operation of the current function, e.g., p_AppFunc[N_i] with its function ID, e.g., 0x31C7, the function might return to AppMgr( ) a return value of 0x396B. This return value is a request to run the function p_AppFunc[ ] having the function ID "0x396B." AppMgr( ) uses the state table to determine if request to run p_AppFunc[ ] having the function ID "0x396B is a transition that is allowed for function ID 0x31C7, and if so, what value of i corresponds to function 0x396B. If it is a valid request, AppMgr( ) sets N_i equal to the new value of i corresponding to function ID "0x396B and, upon next execution of AppMgr( ) the new function ID "0x396B would run.

During initialization of AppMgr( ) and the producing of the state table, simple graph analysis algorithms run to ensure that each state is reachable (no states are isolated) and to make sure that all states are part of a single state machine (i.e., there are not two smaller and totally separated sets of states). The state table validation also requires that no state transition can involve a transition to a non-existent function.

AppMgr( ) always has a stem state (idle state) with function ID 0x0001 that runs when the index N_i is undefined. Initialization of the state machine is done in a second state (initialize state) with its own generic function, with function ID 0x0000. Any time any of the functions change (e.g., by a wireless download of a new function or functions), AppMgr( ) will re-run function 0x0000 and then transition to state function 0x0001. It is a further requirement that one and only one of the user-supplied functions in the complete function set is identified as the entry state. This is the state called by 0x0001 automatically. From that point on the user-supplied functions request the state changes as part of their return values.

Returning to FIG. 3 the state diagram and the table mentioned above, the table below is now populated with the state transitions for the example application described above.

| Function Name (assigned externally) | Function ID (assigned externally) | Allowed Transitions (assigned externally) | Function Index (assigned by AppMgr) | Execution Type (assigned externally) |
|---|---|---|---|---|
| Motion ISR | 0x31C7 | 0x31A2 | 2 | On event |
| Motion Filter | 0x31A2 | 0x31C7 0x3362 | 3 | On event |
| Motion Report Generator | 0x3362 | None (AppMgr Idle) | 4 | On call |
| Heartbeat Generator | 0x33EB | None (AppMgr Idle) | 5 | Perpetual (this is also entry function) |
| AppMgr Idle | 0x0001 | | 1 | Perpetual |
| AppMgr Initialize | 0x0000 | | 0 | On boot, or when called by AppMgr Idle |

The above example is simple for purposes of illustration of the concept. However, more complex application sets can also be used. For example, suppose there are two "states" in a node—the first state corresponding to the perpetual running of functions A, B, and C in a continuous loop and the second state corresponding to the running of functions D and E in another perpetual loop. In the first state (the normal state) function A (the "entry function") runs to completion and requests to AppMgr( ) that it run function B. When function B is complete, it requests function C, which in turn requests function A. Because function A is the entry function and the loop A-B-C-A . . . is a closed loop, functions D and E will normally not run. However, under special conditions suppose function B, when it exits, requests function D rather than C. Function D and E then run in a loop (D-E-D-E . . . ) until one of them requests a function in the first loop. In this way, functions or sets of functions correspond to states, and functions operating in each state manage the state transitions.

When a function exits with no new function requested, AppMgr Idle will simply run the entry point function again. In some cases with very simple nodes, there may be NO entry function, in which case the idle function will just run itself until an event-initiated function is run.

Referring back to FIG. 4, a hypothetical (generic) situation where there are two states (State 1 with functions A, B, and C, and State 2 with functions D and E). State 1 is the normal state and has the entry point, Func A. Under special circumstances State 1 transitions to State 2 when Func B requests the execution of Func D rather than Func C. State 2 may exists for only one cycle (D-E-exit) or many (D-E-D-E- . . . -exit), but when exit occurs in this example, it does so without calling any function. By default then, the AppMgr's Idle function runs Func A since it is the entry point function.

Figure 7:
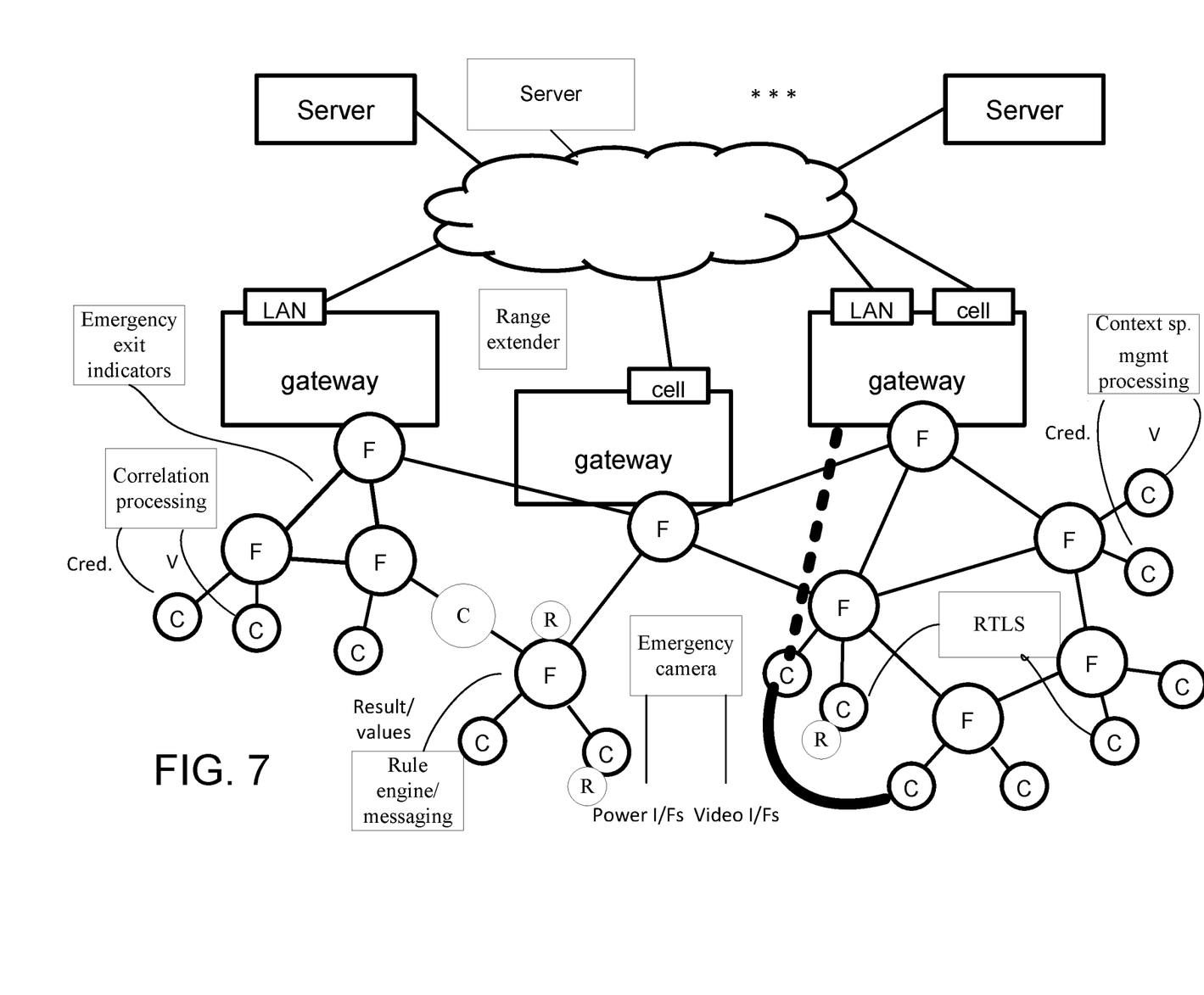
FIG. 7 is a block diagram of components of an example networked security system.

FIG. 7 shows an example of a security system having features of the WSN described with respect to FIGS. 1 to 6 and having the various functionalities described herein. As shown in FIG. 7, correlation processing receives inputs from certain constrained nodes (although these can also be fully functional nodes). These inputs may include credential information and video information, and the correlation processing may produce correlated results that are sent over the network. Context management processing receives inputs from certain constrained nodes (although these can also be fully functional nodes) e.g., credential information and video and grouping information, and performs context processing with results sent over the network. The network supports operation of emergency exit indicators; emergency cameras as well as distributed rule processing and rule engine/messaging processing. Range extenders are used with e.g., gateways, and a real time location system receives inputs from various sensors (e.g., constrained type) as shown. Servers interface to the WSN via a cloud computing configuration and parts of some networks can be run as sub-nets.

The sensors provide in addition to an indication that something is detected in an area within the range of the sensors, detailed additional information that can be used to evaluate what that indication may be without the intrusion detection panel being required to perform extensive analysis of inputs to the particular sensor.

For example, a motion detector could be configured to analyze the heat signature of a warm body moving in a room to determine if the body is that of a human or a pet. Results of that analysis would be a message or data that conveys information about the body detected. Various sensors thus are used to sense sound, motion, vibration, pressure, heat, images, and so forth, in an appropriate combination to detect a true or verified alarm condition at the intrusion detection panel.

Recognition software can be used to discriminate between objects that are a human and objects that are an animal; further facial recognition software can be built into video cameras and used to verify that the perimeter intrusion was the result of a recognized, authorized individual. Such video cameras would comprise a processor and memory and the recognition software to process inputs (captured images) by the camera and produce the metadata to convey information regarding recognition or lack of recognition of an individual captured by the video camera. The processing could also alternatively or in addition include information regarding characteristic of the individual in the area captured/monitored by the video camera. Thus, depending on the circumstances, the information would be either metadata received from enhanced motion detectors and video cameras that performed enhanced analysis on inputs to the sensor that gives characteristics of the perimeter intrusion or a metadata resulting from very complex processing that seeks to establish recognition of the object.

Sensor devices can integrate multiple sensors to generate more complex outputs so that the intrusion detection panel can utilize its processing capabilities to execute algorithms that analyze the environment by building virtual images or signatures of the environment to make an intelligent decision about the validity of a breach.

Memory stores program instructions and data used by the processor of the intrusion detection panel. The memory may be a suitable combination of random access memory and read-only memory, and may host suitable program instructions (e.g. firmware or operating software), and configuration and operating data and may be organized as a file system or otherwise. The stored program instruction may include one or more authentication processes for authenticating one or more users. The program instructions stored in the memory of the panel may further store software components allowing network communications and establishment of connections to the data network. The software components may, for example, include an internet protocol (IP) stack, as well as driver components for the various interfaces, including the interfaces and the keypad. Other software components suitable for establishing a connection and communicating across network will be apparent to those of ordinary skill.

Program instructions stored in the memory, along with configuration data may control overall operation of the panel.

The monitoring server includes one or more processing devices (e.g., microprocessors), a network interface and a memory (all not illustrated). The monitoring server may physically take the form of a rack mounted card and may be in communication with one or more operator terminals (not shown). An example monitoring server is a SURGARD™ SG-System III Virtual, or similar system.

The processor of each monitoring server acts as a controller for each monitoring server, and is in communication with, and controls overall operation, of each server. The processor may include, or be in communication with, the memory that stores processor executable instructions controlling the overall operation of the monitoring server. Suitable software enable each monitoring server to receive alarms and cause appropriate actions to occur. Software may include a suitable Internet protocol (IP) stack and applications/clients.

Each monitoring server of the central monitoring station may be associated with an IP address and port(s) by which it communicates with the control panels and/or the user devices to handle alarm events, etc. The monitoring server address may be static, and thus always identify a particular one of monitoring server to the intrusion detection panels. Alternatively, dynamic addresses could be used, and associated with static domain names, resolved through a domain name service.

The network interface card interfaces with the network to receive incoming signals, and may for example take the form of an Ethernet network interface card (NIC). The servers may be computers, thin-clients, or the like, to which received data representative of an alarm event is passed for handling by human operators. The monitoring station may further include, or have access to, a subscriber database that includes a database under control of a database engine. The database may contain entries corresponding to the various subscriber devices/processes to panels like the panel that are serviced by the monitoring station.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A building sensor node of a sensor network system, wherein the building sensor node comprises one or more memory devices configured to store instructions thereon, that, when executed by one or more processors, cause the one or more processors to:
   execute a first function to provide a first functionality, wherein the first function is associated with a next function identifier of a next function;
   transition between a plurality of states of a state machine based on the next function identifier;
   verify execution of the next function by comparing the next function identifier to a table of allowed transitions;
   receive an additional function from a server; and
   update the building sensor node to provide a second functionality to the building sensor node without rebooting the building sensor node based on the additional function received from the server.

2. The building sensor node of claim 1, wherein the building sensor node is part of of an intrusion detection system.

3. The building sensor node of claim 1, wherein the instructions cause the one or more processors to receive instructions from the server causing the building sensor node to individually delete, substitute, or add functions to the building sensor node altering states in the state machine.

4. The building sensor node of claim 1, wherein the next function identifier is not in the table of allowed transitions, the instructions cause the one or more processors to execute a default function.

5. The building sensor node of claim 1, wherein the instructions cause the one or more processors to update the table of allowed transitions in response to receiving the additional function from the server.

6. The building sensor node of claim 1, wherein the first function may execute multiple times by specifying the first function as the next function identifier.

7. The building sensor node of claim 1, wherein the building sensor node communicates with the server via a network tier comprising one or more gateways.

8. A method of updating a building sensor node of a sensor network system, the method comprising:
executing, by the building sensor node, a first function to provide a first functionality, wherein the first function is associated with a next function identifier of a next function;
transitioning, by the building sensor node, between a plurality of states of a state machine based on the next function identifier;
verifying, by the building sensor node, execution of the next function by comparing the next function identifier to a table of allowed transitions;
receiving, by the building sensor node, an additional function from a server; and
updating the building sensor node to provide a second functionality to the building sensor node without rebooting the building sensor node based on the additional function received from the server.

9. The method claim 8, wherein the building sensor node is part of an intrusion detection system.

10. The method claim 8, the method further comprising individually deleting, substituting, or adding functions to the building sensor node in response to instructions received from the server.

11. The method claim 8, the method further comprising executing a default function in response to the next function identifier being absent from the table of allowed transitions.

12. The method claim 8, the method further comprising updating the table of allowed transitions in response to receiving the additional function from the server.

13. The method claim 8, wherein the building sensor node communicates with the server via a network tier comprising one or more gateways.

14. A system of sensor nodes comprising:
one or more sensor devices, the one or more sensor devices comprising memory configured to store instructions thereon, that, when executed by one or more processors, cause the one or more processors to:
execute a first function to provide a first functionality, wherein the first function is associated with a next function identifier of a next function;
transition between a plurality of states of a state machine based on the next function identifier;
verify execution of the next function by comparing the next function identifier to a table of allowed transitions;
receive an additional function from a server; and
update the sensor device to provide a second functionality to the sensor device without rebooting the sensor device based on the additional function received from the server.

15. The system of claim 14, wherein the one or more sensor devices are sensor devices of an intrusion detection system.

16. The system of claim 14, wherein the instructions cause the one or more processors to receive instructions from the server causing the one or more sensor devices to individually delete, substitute, or add functions to the one or more sensor devices altering states in the state machine.

17. The system of claim 14, wherein the next function identifier is not in the table of allowed transitions, the instructions cause the one or more processors to execute a default function.

18. The system of claim 14, wherein the instructions cause the one or more processors to update the table of allowed transitions in response to receiving the additional function from the server.

19. The system of claim 14, wherein the first function may execute multiple times by specifying the first function as the next function identifier.

20. The system of claim 14, wherein the one or more sensor devices communicate with the server via a network tier comprising one or more gateways.

* * * * *